US008936851B2

(12) United States Patent
Sheng

(10) Patent No.: US 8,936,851 B2
(45) Date of Patent: Jan. 20, 2015

(54) FLAME RETARDANT POLYMERIC FOAM MATERIAL AND MANUFACTURING METHOD THEREOF

(76) Inventor: Yajun Sheng, Lianyungang (CN)

(*) Notice: Subject to any disclaimer, the term of this patent is extended or adjusted under 35 U.S.C. 154(b) by 174 days.

(21) Appl. No.: 13/521,721

(22) PCT Filed: Nov. 30, 2010

(86) PCT No.: PCT/CN2010/001932
§ 371 (c)(1),
(2), (4) Date: Jul. 11, 2012

(87) PCT Pub. No.: WO2011/085531
PCT Pub. Date: Jul. 21, 2011

(65) Prior Publication Data
US 2012/0295095 A1    Nov. 22, 2012

(30) Foreign Application Priority Data

Jan. 12, 2010 (CN) .......................... 2010 1 0018136

(51) Int. Cl.
| | | |
|---|---|---|
| *B32B 27/08* | (2006.01) | |
| *B32B 27/38* | (2006.01) | |
| *C08J 9/00* | (2006.01) | |
| *C08J 9/40* | (2006.01) | |
| *C09K 21/14* | (2006.01) | |
| *C08K 5/523* | (2006.01) | |
| *C08J 9/36* | (2006.01) | |
| *B32B 37/24* | (2006.01) | |

(52) U.S. Cl.
CPC ...... *C08J 9/0038* (2013.01); *C08J 9/40* (2013.01); *C09K 21/14* (2013.01); *C08K 5/523* (2013.01); *C08J 9/365* (2013.01); *C08J 9/0019* (2013.01); *B32B 2037/243* (2013.01); *B32B 2305/022* (2013.01); *B32B 2307/3065* (2013.01); *C08J 2201/036* (2013.01); *C08J 2323/02* (2013.01); *C08J 2325/06* (2013.01); *C08J 2327/06* (2013.01); *C08J 2375/04* (2013.01); *C08J 2463/00* (2013.01); *C08J 2205/10* (2013.01)
USPC .............. 428/319.3; 428/319.7; 252/604; 525/527

(58) Field of Classification Search
CPC ........... C08J 9/40; C08J 9/0038; C08J 9/365; C08J 9/0019; C08J 2205/10; C08J 2201/036; C08J 2323/02; C08J 2325/06; C08J 2327/06; C08J 2375/04; C08J 2463/00; C08K 5/523; B32B 5/18; B32B 2255/102; B32B 2255/28; B32B 2266/02; B32B 2307/3065
USPC .............. 428/308.4, 318.4, 319.7; 252/604; 525/527
See application file for complete search history.

(56) References Cited

U.S. PATENT DOCUMENTS

| | | | | |
|---|---|---|---|---|
| 5,132,171 A | * | 7/1992 | Yoshizawa et al. ......... | 428/317.1 |
| 5,376,718 A | * | 12/1994 | Yada .............................. | 524/409 |
| 5,721,281 A | * | 2/1998 | Blount ............................ | 521/50 |
| 7,060,348 B2 | * | 6/2006 | Creasy et al. .............. | 428/304.4 |
| 2007/0259980 A1 | * | 11/2007 | Park .................................. | 521/85 |

* cited by examiner

Primary Examiner — Hai Vo

(57) ABSTRACT

A flame retardant polymeric foam material and its manufacturing method are provided. The flame retardant polymeric foam material comprises a polymeric foam, and an organic flame retardant coating on the surface of the polymeric foam which is obtained by spraying, coating or by impregnating after the organic flame retardant melts. The present invention selects those types of flame retardants which are very effective in improving the flame retardancy of the polymeric foams; especially those effective for extruded polystyrene foams, and provides a simple and feasible approach to obtain polymeric foams with excellent flame retardant property. The methods can effectively increase the amount of the flame retardants added without affecting foaminess of the foam products and reducing strength or insulation properties of polymeric foams. Different flame retardancy requirements can be satisfied by simply varying the amount of the flame retardants coated on the polymeric foam surface.

8 Claims, No Drawings

FLAME RETARDANT POLYMERIC FOAM MATERIAL AND MANUFACTURING METHOD THEREOF

CROSS-REFERENCE TO RELATED APPLICATION

This application is a national phase application of International application number PCT/CN2010/001932, filed Nov. 30, 2010, which claims the priority benefit of Chinese Patent Application No. 201010018136.7, filed on Jan. 12, 2010, which is hereby incorporated by reference in its entirety.

TECHNICAL FIELD

The present invention relates to a foam material, and in particular, relates to a flame retardant polymeric foam material. The present invention also relates to a method of manufacturing the flame retardant polymeric foam material.

BACKGROUND

Polymeric foams are formed by dispersing gas in polymeric matrices. Due to their outstanding properties, such as light weight, good thermal and electrical insulation, excellent cushioning, good chemical resistance, and low cost, these polymeric foams are widely used in construction, packaging, industry, agriculture, transportation, military and aerospace industries, and their application fields are continually expanding. The market demand for polymeric foams has been increasing rapidly in recent years. The most commonly used polymeric foam materials include rigid and flexible polyurethane (PU) foams, polystyrene (PS) foams, polypropylene (PP) foams, polyvinyl chloride foams and polyethylene (PE) foams.

Polymeric foams exist in various forms, particular in the form of foam sheets, and films. In the production of polymeric foams, molding and extrusion manufacturing processes are commonly used. However, polymeric foam products thus obtained are highly flammable. Taking the extruded polystyrene foam (XPS) as an example, XPS is a good thermal insulating material, thus the XPS boards are often used for building insulation, especially for tall buildings. However, due to their high degree of flammability, every year the economic loss due to the building fire is significant. The controversy over flame retardant requirements becomes more serious. The national legislation has required building materials to meet more stringent flame retardancy requirements. As a result, there is an increasing demand for improving the fire retardant properties of these polymeric foam materials.

A well-known approach for improving the flame retardant properties of the polymeric foams is to add flame retardant additives, including halogenated organic compounds and organic phosphate esters during the foam manufacturing process. For example, hexabromocyclododecane (HBCD) has been widely incorporated into polystyrene foams, and halogenated phosphate ester compounds and phosphate esters have been commonly incorporated as the flame retardants into polyurethane foams.

WO91/19758 describes the limited flame retardancy of HBCD and discloses the use of a mixture of brominated aliphatic compounds, especially HBCD, and brominated aromatic compounds such as decabromodiphenyl ether as flame retardants for PS foams. Another U.S. Pat. No. 6,579,911 discloses using HBCD, phosphate ester or phosphorus compounds and flow promoters to improve the flame retardant efficiency of HBCD. In Chinese Patent No. 99814260.3, flame retardants based on expandable graphite and phosphorus compounds for PS foams are disclosed.

One serious problem associated with adding HBCD into XPS during the foam manufacturing processes is the easy decomposition of HBCD. The decomposition of the HBCD may cause the corrosion of the manufacturing equipment as well as the decrease of the flame retardant properties of the foam product. U.S. Pat. No. 5,639,799 and U.S. Pat. No. 5,717,001 disclose methods of improving thermal stability of HBCD for application in polystyrene foams.

Another problem which must be paid attention to when flame retardants are added into the polymeric foams is that amounts of the flame retardant additives and synergists added must be controlled strictly. As at high loading levels, flame retardant additives will negatively affect the structural qualities and skin qualities of the foams and reduce their strength and insulating properties. The typical loading levels of the flame retardant additives in non-foamed polymeric compositions are normally higher than those in foamed compositions. Therefore, the flame retardant additives used in the polymeric foam compositions must be of high efficiency and small amount. The current available technologies in the art cannot solve this dilemma.

Chinese Patent No. CN200610028214.5 discloses a water-soluble flame retardant that comprises several inorganic salts. The flame retardant is incorporated into the polymeric foams by adding inorganic salts during the foam manufacturing process or by impregnating pre-manufactured polymeric foams into the inorganic salt solution. The flame retardants are thus distributed on the external surface of or inside the polymeric foams. In the prior art, we also found a water-soluble fire-retardant interface coating that comprises several inorganic flame retardants and a polymeric interface agent. The interface coating was applied to the XPS board to enhance flame retardancy of the XPS board. However, the composition of this water-soluble flame retardant is very complicated and the process to apply it is very tedious. Meanwhile, the water-soluble flame retardant normally needs longer drying time, which makes it not suitable for continuous industrial production. The application of the water-soluble flame retardant therefore is limited by the weather. Furthermore, the water-soluble flame retardant will be dissolved in water after applied on the foam surface, thus is not suitable for application on the outdoor heat-insulating materials. Finally, due to the poor compatibility between the inorganic flame retardants and the organic polymeric foam matrix, the flame retardant coating can easily pulverize or peeling and shedding on the surface of polymeric foams, thus affecting the subsequent use of the foams.

SUMMARY

An object of the present invention is to solve the aforementioned deficiencies of the existing technologies, and to provide a flame retardant polymeric foam material with excellent flame retardant properties. This is realized by simply enhancing the use efficiency of the flame retardants.

Another technical problem to be solved by the present invention is to provide a method of manufacturing the flame retardant polymeric foam material.

In one aspect, a flame retardant polymeric foam material is provided. The flame retardant polymeric foam material may comprise a polymeric foam and one or more layers of an organic flame retardant coating on at least a part of a surface of the polymeric foam. The one or more layers of the organic flame retardant coating may be applied to the at least a part of the surface of the polymeric foam by spraying, coating a melted organic flame retardant or impregnating the polymeric foam in the melted organic flame retardant.

In one embodiment, the amount of the organic flame retardant may be from about 5% to about 60% by weight based on a total weight of the flame retardant polymeric foam material, preferably about 10% to about 40% by weight, and more preferably about 15% to about 30% by weight.

In one embodiment, the one or more layers of the organic flame retardant coating on at least a part of the surface of the polymeric foam may additional comprise inorganic flame retardants, flame retardant synergists, pigments, dyes, fillers, talcum powders, quartz sands, cements, interfacial agents, diluents, thickeners, binders, compatibilizers, heat stabilizers, surfactants, glass fibers, or mixtures thereof.

In one embodiment, the polymeric foam may comprise polystyrene foams, polyurethane foams, polypropylene foams, polyethylene foams, polyvinyl chloride foams, or mixtures thereof.

In one embodiment, the polystyrene polymeric foams may comprise expanded polystyrene foam (EPS), extruded polystyrene foam (XPS), or both, and wherein the polyurethane foams are rigid polyurethane foams.

In one embodiment, the organic flame retardant may have a melting point or a softening point between 30° C. and 80° C.

In one embodiment, the organic flame retardant may comprise an organic phosphorus flame retardant, a brominated flame retardant, or both.

In one embodiment, the organic phosphorus flame retardant may comprise triphenyl phosphate, alkylated triphenyl phosphate, or both.

In one embodiment, the brominated flame retardant may be bisphenol epoxy resins with an epoxy equivalent weight of about 300 g/eq. to about 600 g/eq. and a bromine content of about 20% to about 52%, and preferably with an epoxy equivalent weight of about 330 g/eq. to about 420 g/eq. and a bromine content of about 46% to about 50%.

In another aspect, a method of manufacturing a flame retardant polymeric foam material is provided.

In one embodiment, a method of manufacturing a flame retardant polymeric foam material may comprise heating an organic flame retardant till the organic flame retardant melts to afford a melted organic flame retardant, and applying the melted organic flame retardant to at least a portion of a surface of a polymeric foam to afford the flame retardant polymeric foam material. Applying the melted organic flame retardant to at least a portion of the surface of the polymeric foam may comprise spraying or coating the melted organic flame retardant on the at least a portion of the surface of the polymeric foam, or impregnating the polymeric foam in the melted organic flame retardant.

In some embodiments, the amount of the organic flame retardant may be from about 5% to about 60% by weight based on a total weight of the flame retardant polymeric foam material, preferably from about 10% to about 40% by weight, and more preferably from about 15% to about 30% by weight.

In some embodiments, the polymeric foam may comprise polystyrene foams, polyurethane foams, polypropylene foams, polyethylene foams, polyvinyl chloride foams, or a mixture thereof.

In some embodiments, the organic flame retardant may comprise an organic phosphorus flame retardant, a brominated flame retardant, or both.

In some embodiments, the method of manufacturing a flame retardant polymeric foam material may additionally comprise spreading an additional ingredient on the one or more layers of the organic flame retardant coating before the one or more layers of the organic flame retardant coating solidify.

In some embodiments, the additional ingredient may comprise an inorganic flame retardant, a flame retardant synergist, a pigment, a dye, a filler, a talcum powder, a quartz sand, a cement, an interfacial agent, a diluent, a thickener, a binder, a compatilizer, a heat stabilizer, a surfactant, a glass fiber, or a mixture thereof.

In another embodiment, a method of manufacturing a flame retardant polymeric foam material may comprise mixing an organic flame retardant with an additional ingredient to form a first mixture, heating the first mixture till the organic flame retardant melts to afford a second mixture containing a melted organic flame retardant, and applying the second mixture containing the melted organic flame retardant to at least a portion of a surface of a polymeric foam to afford the flame retardant polymeric foam material. Applying the second mixture containing the melted organic flame retardant to at least a portion of the surface of the polymeric foam may comprise spraying or coating the second mixture containing the melted organic flame retardant on the at least a portion of the surface of the polymeric foam, or impregnating the polymeric foam in the second mixture containing the melted organic flame retardant.

In some embodiments, the amount of the organic flame retardant may be from about 5% to about 60% by weight based on a total weight of the flame retardant polymeric foam material, preferably from about 10% to about 40% by weight, and more preferably from about 15% to about 30% by weight.

In some embodiments, the polymeric foam may comprise polystyrene foams, polyurethane foams, polypropylene foams, polyethylene foams, polyvinyl chloride foams, or a mixture thereof.

In some embodiments, the organic flame retardant may comprise an organic phosphorus flame retardant, a brominated flame retardant, or both.

In some embodiments, the additional ingredient may comprise an inorganic flame retardant, a flame retardant synergist, a pigment, a dye, a filler, a talcum powder, a quartz sand, a cement, an interfacial agent, a diluent, a thickener, a binder, a compatilizer, a heat stabilizer, a surfactant, a glass fiber, or a mixture thereof.

DETAILED DESCRIPTION OF SAMPLE EMBODIMENTS

The technical problems to be solved by the present invention are realized through the following technical schemes. The present invention provides a flame retardant polymeric foam material. The flame retardant polymeric foam material comprises a polymeric foam and an organic flame retardant coating on the surface of the polymeric foam. The organic flame retardant coated is obtained by spraying, coating a melted organic flame retardant, or impregnating the polymeric foam in the melted organic flame retardant after the organic flame retardant melts.

The organic flame retardant coating in the present invention partially or completely covers the surface of the polymeric foam.

The organic flame retardants employed in the present invention can be a single compound as well as a mixture of several compounds. They can also contain some conventional additives.

The term 'melts" in the "after organic flame retardant melts" means that the organic flame retardants can be partially or completely melted as long as it can be applied to the surface of the polymeric foam. In general, in order to get good spraying, coating, or impregnating effect, at least 40% of the flame retardant has to be melted.

The technical problems to be solved by the present invention can be further realized by the following technical scheme. The flame retardant polymeric foam material, characterized in that, an amount of organic flame retardant is from 5%-60% by weight based on the total weight of the flame retardant polymeric foam material, preferably 10% to 40%, and more preferably 15% to 30%.

The technical problems to be solved by the present invention can be further realized by the following technical scheme. The flame retardant polymeric foam material, characterized in that, the organic flame retardant applied to the surface of the polymeric foam material also comprises one or more following materials: inorganic flame retardants, flame retardant synergists, pigments, dyes, filler, talcum powders, quartz sands, cements, interfacial agents, diluents, thickeners, binders, compatilizers, heat stabilizers, surfactants, or glass fibers. Some of above-mentioned materials, such as quartz sands, talcum powders and fillers, can increase the roughness of the material surface and allow the convenient use of the polymeric foams of the present invention; some materials, such as hot melt adhesives, polymeric powders, interface agents and glass fibers, can enhance the adhesion between the organic flame retardant layer and the polymeric foam material; and some materials, such as organic flame retardant HBCD, BDDP, TBBPA, DBDPE, chlorinated paraffin, inorganic flame retardant magnesium hydroxide, aluminum hydroxide, microencapsulated red phosphorus, cyanuric acid, ammonium polyphosphate, MCA, and antimony oxide, can enhance the flame retardancy effect or reduce the cost. The type and amount of these materials in the organic flame retardant coating are chosen according to requirements of the foam materials.

The technical problems to be solved by the present invention can be further realized by the following technical scheme. The flame retardant polymeric foam material, characterized in that, the polymeric foam material comprises one or more of the following polymeric foams: polystyrene foams, polyurethane foams, polypropylene foams, polyethylene foams, or polyvinyl chloride foams.

The technical problems to be solved by the present invention can be further realized by the following technical scheme. The flame retardant polymeric foam material, characterized in that, the polystyrene polymeric foam comprises an expanded polystyrene foam (EPS) and/or an extruded polystyrene foam (XPS), and the polyurethane foam comprises an rigid polyurethane foam.

The technical problems to be solved by the present invention can be further realized by the following technical scheme. The flame retardant polymeric foam material, characterized in that, the organic flame retardant may have a melting point or a softening point between 30° C. and 80° C.

The technical problems to be solved by the present invention can be further realized by the following technical scheme. The flame retardant polymeric foam material, characterized in that, the organic flame retardant comprises an organic phosphorus flame retardant, and/or a brominated flame retardant. The organic phosphorus flame retardant comprises triphenyl phosphate, and/or alkylated triphenyl phosphate.

The technical problems to be solved by the present invention can be further realized by the following technical scheme. The flame retardant polymeric foam material, characterized in that, the brominated flame retardant comprises bisphenol epoxy resins with an epoxy equivalent weight of 300 g/eq. to 600 g/eq. and a bromine content of 20% to 52%, preferably with an epoxy equivalent weight of 330 g/eq. to 420 g/eq. and a bromine content of 46% to 50%.

The technical problems to be solved by the present invention can be further realized by the following technical scheme. The present invention provides a method of manufacturing above-mentioned flame retardant polymeric foam material, characterized in that, heating an organic flame retardant till the organic flame retardant melts, or mixing the organic flame retardant with an appropriate amount of one or more of the following materials: inorganic flame retardants, flame retardant synergists, pigments, dyes, fillers, talcum powders, quartz sands, cements, interfacial agents, diluents, thickeners, binders, compatilizers, heat stabilizers, surfactants, or glass fibers; after evenly mixed, heating the organic flame retardant or the organic flame retardant mixture till the organic flame retardant melts; forming an organic flame retardant coating on the surface of the polymeric foam by means of spraying, coating or impregnating. After cooling and drying, the flame retardant polymeric foam material is obtained.

The technical problems to be solved by the present invention can be further realized by the following technical scheme. The present invention provides a method of manufacturing above-mentioned flame retardant polymeric foam material, characterized in that, heating an organic flame retardant till the organic flame retardant melts; forming an organic flame retardant coating on the surface of the polymeric foam by means of spraying, coating or impregnating; before the flame retardant coating dried, spreading an appropriate amount of one or more of the following materials, inorganic flame retardants, flame retardant synergists, pigments, dyes, fillers, talcum powders, quartz sands, cements, interfacial agents, diluent, thickeners, binders, compatilizers, heat stabilizers, surfactants, or glass fibers on the organic flame retardant coating. After cooling and drying, the flame retardant polymeric foam material is obtained.

The polymeric foams in the present invention refer to the meaning of the broadest range and relates to polymeric foams of any shape, length, thickness, density or their composites. The polymeric foam preferably is at least one selected from polystyrene foams, polypropylene foams, polyethylene foams, and polyurethane foams; more preferably is polystyrene foams, including but not limited to expanded polystyrene foams (EPS) and extruded polystyrene foams (XPS), and most preferably is XPS. Polyurethane foams are preferably rigid polyurethane foams. The manufacturing processes of abovementioned polymeric foams have been disclosed in the art. The present invention does not limit manufacturing equipment, composition of raw materials, and types of foaming agents. It should be also noted that in some embodiments of the present invention, the pre-manufactured polymeric foams may already contain certain flame retardants. These pre-manufactured polymeric foams also fall within the scope of the present intention.

There are many types of flame retardants. Among them, halogenated organic compounds and organic phosphate esters are the most common kinds. For example, HBCD is widely used in the polystyrene foams, and halogenated phosphate ester compounds and phosphate ester flame retardants are widely used in polyurethane foams. The organic flame retardants employed in the present invention can be a single compound as well as a mixture of several compounds. The melting points or softening points of these flame retardants are between 30° C. and 80° C.

The organic-based flame retardants are preferably used in the present invention since they have good compatibility with the polymeric foams which are also organic-based materials, thus these flame retardants can tightly bound with the polymeric foams. In addition, during the subsequent application of the flame retardant polymeric foams, the organic flame retardant coating on the external surface of the polymeric foams also has a good compatibility with the commonly used interface agents, thus these organic-based flame retardants usually have less influence on the subsequent use of the flame retardant polymeric foams.

Although flame retardants which are in a liquid form at ambient temperature can be easily coated on the surface of the foam products to improve foam products' flame retardancy, this type of flame retardants will affect the subsequent application of the foam products since they cannot be solidified and dried at ambient temperature. The flame retardants used in the present invention are not limited to a single compound; mixtures of flame retardants also fall within the scope of the present invention as long as the melting point or softening point of the mixtures is between 30° C. and 80° C. The flame retardants of the present invention are preferably selected from, but not limited to, organic phosphorus-based flame retardants, brominated flame retardants and their mixtures, including, but not limited to, at least one of following: triphenyl phosphate, alkylated triphenyl phosphate and their mixtures. The phosphorus-based flame retardant is preferably triphenyl phosphate. The brominated flame retardants are preferably bisphenol epoxy resins with epoxy equivalent weights of 300~600 g/eq. and bromine contents of 20-52%.

Abovementioned organic flame retardant is first melted by heating or other methods. The resulting melted flame retardant is then applied to the surface of the polymeric foam by spraying, coating or by impregnating the polymeric foam in the melted flame retardant. An organic flame retardant coating is obtained after cooling and drying. The methods of applying flame retardants to the surface of polymeric foams are not the key inventive point of the present invention; the flame retardants can be applied on the surface of the polymeric foams by any method known in the art. For example, the flame retardants can be distributed and/or coated on the polymeric foams by means of spraying, impregnating, etc. They can also be applied to the polymeric foams surface by coating machines using rolls and chill rolls, "blade" coating, extrusion coating, friction coating, coating, spraying, foaming and other similar methods. As mentioned above, the amount of the flame retardants coated on the polymeric foams should be high enough to render the polymeric foam sufficient flame retardancy. After applying the flame retardants, the flame retardant coating can be cooled by blasting or any method that can solidifies the flame retardant coating. This flame retardant coating can be a single- or multi-layer coating.

In addition to the organic flame retards, the flame retardant coating on the polymeric foam surface can optionally include additional ingredients. These ingredients can be one or more flame retardants, pigments, dyes, fillers, talcum powders, quartz sands, cements, interfacial agents, diluents, thickeners, binders, compatilizers, heat stabilizers, surfactant or glass fibers and the like. These additional ingredients can be incorporated on the polymeric foam surface together with the preferred flame retardants of the present invention or can be spread on the polymeric foam surface before the solidification of flame retardants used in the present invention. These additional ingredients can change surface color and surface roughness of the polymeric foam, enhance the adhesion between the flame retardant coating and the polymeric foam, and reduce the cost.

The present invention selects those types of flame retardants which are very effective in improving the flame retardancy of the polymeric foams; especially those effective for extruded polystyrene foams, and provides a simple and feasible approach to obtain polymeric foam materials with excellent flame retardant properties. The methods of the present invention can effectively increase the amount of the flame retardants added without sacrificing the foaming performance, the strength, and the insulation properties of polymeric foam products. Different flame retardancy requirements can be satisfied by simply varying the amount of the flame retardants coated on the polymeric foam surface.

Surprisingly, when using the triphenyl phosphate (TPP) as the flame retardant coating, the polymeric foam coated with the TPP showed superior flame retardant properties when compared with the polymeric foam containing the same amount of TPP additives. The reason might be that the polymeric foam with flame retardant coated on its surface has a higher unit concentration of flame retardant than the polymeric foam having flame retardant distributed inside the foam. When the foam product is in contact with the flame, the flame retardant coated on its surface first separates the flame from the foam product. Meanwhile, since the polymeric foam contracts under heating, the concentration of the flame retardant on the foam surface is further increased, as a result, the self-extinguish ability is enhanced.

The methods of the present invention are simple and feasible. The solidification time of the flame retardant coating is also short. Thus, the methods are suitable for industrial application. The resulting flame retardant polymeric foam materials exhibit excellent flame retardant properties. The methods of the present invention can effectively increase the amount of the flame retardants added without sacrificing the strength and insulation properties of polymeric foam products. The amount of the flame retardant can be easily varied to meet different flame retardancy requirements.

The following examples are provided for the purpose of illustrating and help ordinary skilled in the art to better understand, not limiting, the present invention.

EXAMPLE 1

A flame retardant polymeric foam material comprises a polymeric foam and an organic flame retardant coating on the surface of the polymeric foam. The organic flame retardant coating is obtained by spraying, coating a melted organic flame retardant, or impregnating the polymeric foam in the melted organic flame retardant after the organic flame retardant melts.

EXAMPLE 2

In the flame retardant polymeric foam material according to Example 1, the amount of the organic flame retardant is 5 wt. % of the total weight of the flame retardant polymeric foam material.

EXAMPLE 3

In the flame retardant polymeric foam material according to Example 1, the amount of the organic flame retardant is 60 wt. % by weight of the total weight of the flame retardant polymeric foam material.

EXAMPLE 4

In the flame retardant polymeric foam material according to Example 1, the amount of the organic flame retardant is 10 wt. % of the total weight of the flame retardant polymeric foam material.

EXAMPLE 5

In the flame retardant polymeric foam material according to Example 1, the amount of the organic flame retardant is 40 wt. % of the total weight of the flame retardant polymeric foam material.

EXAMPLE 6

In the polymeric foam material according to Example 1, the amount of the organic flame retardant is 30 wt. % of the total weight of the flame retardant polymeric foam material.

EXAMPLE 7

In the flame retardant polymeric foam material according to Example 1, the amount of the organic flame retardant is 10 wt. % of the total weight of the flame retardant polymeric foam material.

EXAMPLE 8

In the flame retardant polymeric foam material according to any one of Examples 1-7, the organic flame retardant coated on the surface of the polymeric foam also comprises one or more following materials: inorganic flame retardants, flame retardant synergists, pigment, dyes, fillers, talcum powders, quartz sands, cements, interfacial agents, diluents, thickeners, binders, compatilizers, heat stabilizers, surfactants, or glass fibers.

EXAMPLE 9

In the flame retardant polymeric foam material according to any one of Examples 1-8, the polymeric foam comprises one or more of the following polymeric foams: polystyrene foams, polyurethane foams, polypropylene foams, polyethylene foams, or polyvinyl chloride foams.

EXAMPLE 10

In the flame retardant polymeric foam material of Example 9, the polystyrene polymeric foams comprise expanded polystyrene foams (EPS) and/or extruded polystyrene foams (XPS), and the polyurethane foams comprises rigid polyurethane foams.

EXAMPLE 11

In the flame retardant polymeric foam material according to any one of Examples 1-10, the organic flame retardant may have a melting point or a softening point between 30° C. and 80° C.

EXAMPLE 12

In the flame retardant polymeric foam material according to any one of Examples 1-11, the organic flame retardant comprises organic phosphorus flame retardant, and/or brominated flame retardants. The organic phosphorus flame retardants comprise triphenyl phosphate, and/or alkylated triphenyl phosphate.

EXAMPLE 13

In the flame retardant polymeric foam material according to Example 12, the brominated flame retardants comprise bisphenol epoxy resins with an epoxy equivalent weight of 300 g/eq. to 600 g/eq. and a bromine content of 20% to 52%.

EXAMPLE 14

In the flame retardant polymeric foam material according to Example 12, the brominated flame retardants comprise bisphenol epoxy resins with an epoxy equivalent weight of 330 g/eq. to 420 g/eq. and a bromine content of 46% to 50%.

EXAMPLE 15

A method of manufacturing an polymeric foam material according to any one of Examples 1-14, comprising heating an organic flame retardant till the organic flame retardant melts, or mixing the organic flame retardant with an appropriate amount of one or more of the materials selected from the group consisting of inorganic flame retardants, flame retardant synergists, pigments, dyes, fillers, talcum powders, quartz sands, cements, interfacial agents, diluent, thickeners, binder, compatilizers, heat stabilizers, surfactants, and glass fibers; after evenly mixed, heating the organic flame retardant or the organic flame retardant mixture till the organic flame retardant melts; forming an organic flame retardant coatings on the surface of the polymeric foam by means of spraying, coating or impregnating. After cooling and drying, the flame retardant polymeric foam material is obtained.

EXAMPLE 16

A method of manufacturing an polymeric foam material according to any one of Examples 1-14, heating an organic flame retardant till the organic flame retardant melts; forming an organic flame retardant coatings on the surface of the polymeric foam by means of spraying, coating or impregnating; before the flame retardant layer dried, spreading an appropriate amount of one or more of the materials selected from the group consisting of inorganic flame retardants, flame retardant synergists, pigments, dyes, fillers, talcum powders, quartz sands, cements, interfacial agents, diluents, thickeners, binders, compatilizers, heat stabilizers, surfactants, and glass fibers on the organic flame retardant coating. After cooling and drying, the flame retardant polymeric foam material is obtained.

EXAMPLE 17

Manufacturing a flame retardant polymeric foam material. First, heating the flame retardant triphenyl phosphate (Manufacturer: Tianjin Lianrui Chemical Co. Ltd.) above 50° C. so as to melt the triphenyl phosphate to liquid; heating the flame retardant brominated epoxy resin (Model Number: EX-48) above 60° C. so as to melt the brominated epoxy resin to liquid; then impregnating the pre-prepared polymeric foam in the liquid; taking it out and drying it to obtain the flame retardant foam composition; or adding the liquid flame retardant into a spraying device and then spraying the liquid flame retardant on the surface of the foam to manufacture the flame retardant polymeric foam material.

EXAMPLE 18

The effectiveness in improving flame retardancy of polymeric foams by forming an organic flame retardant coating on the surface of XPS, EPS, and rigid polyurethane foam from triphenyl phosphate, brominated epoxy resin or their mixture is described below.

First, heating the flame retardant triphenyl phosphate above 50° C. so as to melt the triphenyl phosphate to liquid;

heating the flame retardant brominated epoxy resin above 60° C. so as to melt the brominated epoxy resin to liquid;

impregnating the pre-manufactured XPS board in the liquid, then taking-out the XPS board. The XPS board was dried to obtain the flame retardant polymeric foam. Or adding the liquid triphenyl phosphate into a spraying device and spraying the liquid flame retardant onto the surface of the XPS board to afford the flame retardant polymeric foam material.

Or adding the solid triphenyl phosphate or brominated epoxy resin flame retardant into a hot-melt sizing machine with a heating device, and after they melt, coating the surface of the foam with the flame retardant by rolling on the foam surface to afford the flame retardant polymeric foam.

Control sample 1: ordinary non-flame retardant XPS (Manufacturer: Nanjing Feininger Company).

Control sample 2: flame retardant XPS (Manufacturer: Nanjing Owens Corning Company).

Control sample 3: ordinary non-flame retardant EPS.

Control sample 4: ordinary non-flame retardant rigid polyurethane foam.

In the following experiment examples of manufacturing flame retardant polymeric foam materials, unless otherwise indicated, the methods are the same as aforementioned methods.

EXPERIMENT EXAMPLE 1

Control sample 1, spraying 5% triphenyl phosphate on the surface of the ordinary non-flame retardant XPS board.

EXPERIMENT EXAMPLE 2

Control sample 1, spraying 10% triphenyl phosphate on the surface of the ordinary non-flame retardant XPS board.

EXPERIMENT EXAMPLE 3

Control sample 2, spraying 5% triphenyl phosphate on the surface of the flame retardant XPS board.

EXPERIMENT EXAMPLE 4

Control sample 3, coating 30% triphenyl phosphate on the surface of the ordinary non-flame retardant EPS.

EXPERIMENT EXAMPLE 5

Control sample 4, coating 15% triphenyl phosphate by rolling the melted triphenyl phosphate on the surface of the ordinary non-flame retardant rigid polyurethane foam.

EXPERIMENT EXAMPLE 6

Control sample 4, spraying 25% triphenyl phosphate on the surface of the ordinary non-flame retardant rigid polyurethane foam plastic.

EXPERIMENT EXAMPLE 7

Control sample 1, spraying 10% brominated epoxy resin on the surface of the ordinary non-flame XPS board.

EXPERIMENT EXAMPLE 8

Control sample 1, coating 30% brominated epoxy resin by rolling the melted brominated epoxy resin on the surface of the ordinary non-flame XPS board.

EXPERIMENT EXAMPLE 9

Control sample 4, coating 15% brominated epoxy resin by rolling on the surface of the ordinary non-flame rigid polyurethane foam plastic.

EXPERIMENT EXAMPLE 10

Control sample 1, spraying a mixture of 10% triphenyl phosphate and 5% brominated epoxy resin on the surface of the ordinary non-flame XPS board.

EXPERIMENT EXAMPLE 11

Control sample 3, coating 65% brominated epoxy resin on the surface of the ordinary non-flame retardant EPS.

Assessment methods: the flame retardant properties of flame retardant polymeric foam material prepared in the present invention and commercially available flame retardant or non-flame retardant polymeric foams were tested and compared according to the following methods:

1. Flame retardancy: The flame retardancy was detected in accordance with GB 8626. If the flame retardancy reached B2 grade standard, it passed the detection, otherwise it failed the detection.

2. Oxygen index: The combustion performance of the flame retardant foam was evaluated under the stated experiment conditions according to the requirements of GB2406 (method of detecting oxygen index).

3. Self-extinguishing (SE): Yes: LOI<≥26.0; No: LOI<26.0.

The assessment results are listed in Table 1 below:

TABLE 1

| Number | Flame Retardancy | Oxygen Index (LOI) | Self-Extinguishing (SE) |
|---|---|---|---|
| Control sample 1 | Not Pass | 20 | No |
| Control sample 2 | Pass | 24 | No |
| Control sample 3 | Not Pass | 19 | No |
| Control sample 4 | Not Pass | 20 | No |
| Experiment example 1 | Pass | 24 | No |
| Experiment example 2 | Pass | 28 | Yes |
| Experiment example 3 | Pass | 26 | Yes |
| Experiment example 4 | Pass | 32 | Yes |
| Experiment example 5 | Pass | 26 | Yes |
| Experiment example 6 | Pass | 32 | Yes |
| Experiment example 7 | Pass | 30 | Yes |
| Experiment example 8 | Pass | 34 | Yes |
| Experiment example 9 | Pass | 31 | Yes |
| Experiment example 10 | Pass | 32 | Yes |
| Experiment example 11 | Pass | 36 | Yes |

What is claimed is:

1. A flame retardant polymeric foam material, comprising:
   a non-flame retardant polymeric foam comprising expanded polystyrene foam (EPS), extruded polystyrene foam (XPS), or a mixture thereof; polyurethane foam; and
   one or more layers of an organic flame retardant coating on at least a part of an exterior surface of the non-flame retardant polymeric foam, the organic flame retardant comprising bisphenol epoxy resins having an epoxy equivalent weight of about 300 g/eq. to about 600 g/eq. and a bromine content of about 20 to 52 weight percent, wherein the one or more layers of the organic flame retardant coating are applied to the at least a part of the exterior surface of the polymeric foam by spraying or coating a melted organic flame retardant or by impregnating the polymeric foam in the melted organic flame retardant, wherein the flame retardant polymeric foam material has an oxygen index in a range from about 26 to about 36.

2. The flame retardant polymeric foam material according to claim 1, wherein an amount of the organic flame retardant is from about 5% to about 60% by weight based on a total weight of the flame retardant polymeric foam material.

3. The flame retardant polymeric foam material according to claim 1, wherein the one or more layers of the organic flame retardant coating on at least a part of the exterior surface of the non-flame retardant polymeric foam further comprises inorganic flame retardants, flame retardant synergists, pigments, dyes, fillers, talcum powders, quartz sands, cements, interfacial agents, diluents, thickeners, binders, compatilizers, heat stabilizers, surfactants, glass fibers, or a mixture thereof.

4. The flame retardant polymeric foam material according to claim 1, wherein the non-flame retardant polymeric foam further comprises polypropylene foams, polyethylene foams, polyvinyl chloride foams, or a mixture thereof.

5. The flame retardant polymeric foam material according to claim 1, wherein the organic flame retardant has a melting point or a softening point between 30° C. and 80° C.

6. The flame retardant polymeric foam material according to claim 1, wherein the organic flame retardant further comprises an organic phosphorus flame retardant.

7. The flame retardant polymeric foam material according to claim 6, wherein the bisphenol epoxy resins have an epoxy equivalent weight of about 330 g/eq. to about 420 g/eq. and a bromine content of about 46 to 50 weight percent.

8. The flame retardant polymeric foam material according to claim 6, wherein the organic phosphorus flame retardant comprises triphenyl phosphate, alkylated triphenyl phosphate, a mixture thereof.

* * * * *